(12) United States Patent
Tang

(10) Patent No.: US 7,013,320 B2
(45) Date of Patent: Mar. 14, 2006

(54) APPARATUS AND METHOD FOR REMAINDER CALCULATION USING SHORT APPROXIMATE FLOATING-POINT QUOTIENT

(75) Inventor: Ping Tak Peter Tang, Hayward, CA (US)

(73) Assignee: Intel Corporation, Santa Clara, CA (US)

( * ) Notice: Subject to any disclaimer, the term of this patent is extended or adjusted under 35 U.S.C. 154(b) by 556 days.

(21) Appl. No.: 10/058,187

(22) Filed: Jan. 25, 2002

(65) Prior Publication Data

US 2003/0145029 A1 Jul. 31, 2003

(51) Int. Cl.
*G06F 7/44* (2006.01)
(52) U.S. Cl. .................................................. 708/504

(58) Field of Classification Search ............... 708/504, 708/502, 653, 654
See application file for complete search history.

(56) References Cited

U.S. PATENT DOCUMENTS

| 3,852,581 | A | * | 12/1974 | Reynard et al. | 708/656 |
| 4,488,247 | A | * | 12/1984 | Inagami et al. | 708/654 |
| 4,785,412 | A | * | 11/1988 | Tran | 708/650 |
| 5,249,149 | A | * | 9/1993 | Cocanougher et al. | 708/504 |
| 5,696,713 | A | * | 12/1997 | Kovacs | 708/653 |
| 6,782,405 | B1 | * | 8/2004 | Matula et al. | 708/504 |

* cited by examiner

*Primary Examiner*—Tan V. Mai
(74) *Attorney, Agent, or Firm*—Crystal D. Sayles

(57) ABSTRACT

An apparatus and method for creating lookup tables of approximate floating-point quotients which exactly represent the underlying value, within the range of the specified precision. The lookup tables are created without any extraneous data beyond what is needed and also without sacrificing numerical accuracy, and may be creating for any radix.

17 Claims, 4 Drawing Sheets

APPARATUS AND METHOD FOR REMAINDER CALCULATION USING SHORT APPROXIMATE FLOATING-POINT QUOTIENT

FIELD OF THE INVENTION

The present invention relates to implementing efficient floating-point operations in a computer system. More particularly, the present invention related to creating computer-based lookup tables responsive to a set of accuracy requirements.

BACKGROUND OF THE INVENTION

As will be described in detail below, the calculation of elementary mathematical functions, such as a two argument arc tangent ($\tan^{-1}$ (A/B)), in a computer system may best be efficiently performed using a remainder from a floating-point quotient and lookup tables. Known prior art techniques do not typically create such lookup tables to efficiently return results of a specified accuracy. The present invention, however, is directed at using a floating-point remainder ($R_{fp}$), derived from a floating-point quotient ($Q_{fp}$), to create lookup tables based on an approximate remainder that "exactly" represents the underlying arithmetic value within the specified accuracy. The created lookup tables are thus efficiently tailored to the intended use, with no more and no less accuracy than will be needed in the particular application. Such efficiency can result in both faster calculations and more compact lookup tables.

The remainder in a division process is an important entity in many floating-point calculations. In fact, the remainder calculation is considered so basic an operation that IEEE Standard 754 mandates such an operation be supported. IEEE Std. 754-1985, reaffirmed 1990, Standard for Binary Floating-Point Arithmetic. Unfortunately, most hardware implementations of the IEEE remainder are slow, with resources often dedicated to other operations such as basic floating-point add, subtract, and multiply, or others such as single-instruction-multiple-data operations. Moreover, in some common situations, the definition of the IEEE remainder is not "naturally" applicable, as the IEEE quotient is an integer quotient, whereas many applications require the remainder with a floating-point quotient.

DETAILED DESCRIPTION

Figure 1:
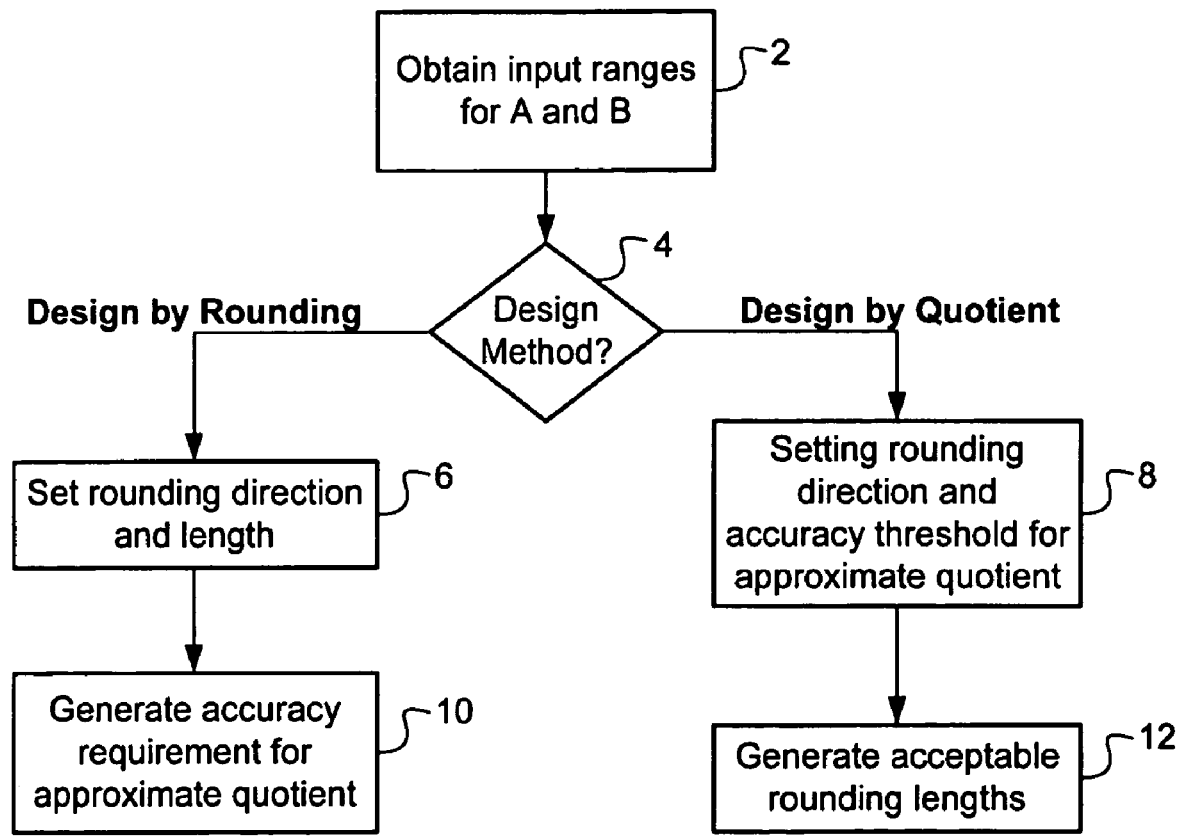
FIG. 1 is a flow chart of the implementation of a generalized floating-point remainder procedure used to create lookup tables in accordance with an embodiment of the present invention.

The present invention uses a floating-point quotient ($Q_{fp}$) instead of the more standard IEEE integer quotient ($Q_{int}$) to create lookup tables for efficient computer-based calculations. An approximation of a floating-point remainder ($R_{fp}$) can be derived from $Q_{fp}$ and $R_{fp}$ can be used to create lookup tables which are created to the precise accuracy needed for a particular implementation.

More specifically, the IEEE remainder $R_{IEEE}$ of a dividend A and divisor B is defined as:

$$RIEEE = A - Q_{int} \times B$$

where $Q_{int}$ is the quotient A/B rounded to the closest integer value. In many applications, however, the following floating-point remainder is more useful:

$$R_{fp} = A - Q_{fp} \times B$$

where $Q_{fp} \approx A/B$ and $Q_{fp}$ has a fixed number of significant bits L. That is, $Q_{fp}$ is of the form:

$$Q_{fp} = 2^l \times 1.q_1 q_2 \ldots q_{L-1}$$

for a fixed L.

There are three general processes that are needed before actually creating the lookup table in accordance with the present invention, obtaining an approximate quotient (W), rounding that quotient, and computing the floating-point remainder ($R_{fp}$).

For the approximate quotient computation, obtain a floating-point value W:

$$W \approx A/B.$$

Next, use some rounding method to obtain $Q_{fp}$ from W, thus:

$$Q_{fp} = \text{rounding (W, direction L).}$$

There are at least four rounding directions easily accommodated by the present invention: nearest, midpoint, inwards, and outwards, of which the first two are the most common. Finally, for the computation, compute $R_{fp}$:

$$R_{fp} = A - Q_{fp} \times B.$$

An important property in this remainder definition is that $R_{fp}$ must be obtainable exactly, that is, $A - Q_{fp} \times B$ is a value representable exactly in the underlying floating-point format. In order for this exactness property to hold, we must satisfy certain constraints relating the accuracy of the approximate quotient, $Q_{fp}$, the quotient length L, as well as the rounding direction. In a typical scenario, one or more design parameters are fixed, such as rounding length and direction, and the other parameter(s), in this case, the accuracy requirement of the approximate quotient, must be determined to satisfy the intricate constraints.

With the present invention, in addition to creating lookup tables, we can check the design of a general floating-point quotient based remainder instruction with different design constraints. For example, one could calculate the accuracy required for the approximate quotient ($Q_{fp}$) to design a floating-point quotient based remainder algorithm that uses a "nearest" rounding to 5 significant bits. Alternatively, one could find how many significant bits can be used as the "midpoint" quotient, given an approximate quotient with a given accuracy. Applications for this remainder operation include, but are not limited to, the computation of elementary functions, IEEE division, and square root operations.

We discuss the present invention in comparison with both the formulation of the remainder to the IEEE remainder definition, in certain applications, and with a "manual" approach, where a designer will typically carry out analysis for each specific set of constrained parameters.

First, a discussion of the floating-point quotient over integer quotient. When computing functions with the quotient of arguments f (A/B), a table-lookup technique, may be useful to obtain a short, say, 4-significant-bit, approximation Q to A/B and exploit specific relationship:

$$f(A/B)=f(Q)+g((A/B)-Q).$$

$|(A/B)-Q|$ is often smaller than $|A/B|$ by a factor of $\frac{1}{32}$. This "shift off" property is important as the rounding error in computing g is relatively insignificant. Clearly, $(A/B)-Q=(A-QB)/B$, which includes our definition of the remainder $R_{fp}$. If one were to instead use an IEEE remainder, the alternative is to restrict A and B so that $|A| \leq |B|$ and find the remainder:

$$R_{IEEE}=16 \times A-Q \times B.$$

or, $$f(A/B)=f(Q/16)+g((16A/B-Q)/16).$$

There are two drawbacks to using the $R_{IEEE}$ approach. First, we have to perform some preprocessing steps such as restricting ourselves to $|A| \leq |B|$ and scale up A by 16. Second, and more important, is that the argument to g is no longer always of a factor of 32 or so smaller than $|A/B|$. In fact, when $|A/B| \approx \frac{1}{16}$, the argument to g may be only smaller than $|A/B|$ by a factor of 2.

Another situation, which is getting more common in modem computer architectures, is that the IEEE division is typically implemented in software. In this situation, a fast floating-point remainder ($R_{fp}$) based on, a 4-significant-bit floating-point remainder can be used to implement a 4-bit at a time division algorithm. However, with an IEEE type of remainder calculation, every step of the iteration requires explicit scaling.

In the IEEE remainder, the integer quotient is defined as an infinitely precise quotient (A/B) rounded to the nearest integer value. This definition is extremely tight and thus most IEEE remainder operations are implemented on top of IEEE division operations. Worse still, in hardware where an aggressive division algorithm is used, a separate radix-2 restoring algorithm (a simple but slow available algorithm) is typically used to calculate the IEEE remainder. That the remainder can be represented, and thus computable exactly, even if the short quotient is "inexact" is crucial. The present invention's use of an approximate quotient allows much more flexibility, such as the use of built-in approximate reciprocal or other ad-hoc approaches to calculate approximate, and even possibly biased, quotients.

There are also advantages to using different rounding directions. In contrast, the IEEE remainder defines the integer quotient to be the round-to-nearest integer value of the infinitely precise quotient. The present invention's formulation allows for multiple rounding directions that may be better suited for certain situations.

The present invention is based on a detailed general error analysis allow us to explore, in an automated manner, the vast design space. Niche areas in the design space can often be missed when not explored exhaustively via machine automation. Furthermore, repeated manual analysis is error prone, especially in some subtle "corner" cases.

The general framework of three of the building blocks of the remainder ($R_{fp}$) operation is as follows:

1. Approximate quotient computation: Obtain a floating-point value $$W = \frac{A}{B}(1+\alpha) \approx \frac{A}{B}.$$

where, $A=\sigma_A \times 2^m \times a,$ $B=\sigma_B \times 2^n \times b,$ $\sigma_A, \sigma_B = \pm 1,$ and $1 \leq a,b < 2.$ 2. Rounding: Use some rounding method to obtain $Q_{fp}$ from W. W is of the form:

$$W = \sigma_w 2^k \times 1.w_1 w_2 \ldots w_{p-1}$$

where $\sigma_w = \pm 1$ and p is the native floating-point precision of the computer. For example, p=24 single precision and p=53 for double precision under the IEEE standard. We obtain:

$$Q_{fp}=\text{rounding } (W, \text{direction}, L)=W+\sigma_w \times 2^k \times \beta$$

where the exponent k is the exponent of W.

Four common rounding methods that are easily accommodated by embodiments of the present invention, nearest, midpoint, inwards, and outwards. However, those of ordinary skill in the art will recognize that the present invention could easily be adapted to virtually any rounding method and is not intended to be limited to any particular rounding method. The definitions of the rounding modes can be seen in terms of the range of values in terms of $\beta_{min}$ and $\beta_{max}$, and where the value of $\beta_{min}$ and $\beta_{max}$ are tabulated below:

$$2^k \beta_{min} \leq |W|-|Q| \leq 2^k \beta_{max}$$

| direction | $\beta_{min}$ | $\beta_{max}$ |
|---|---|---|
| nearest | $-1/2^L$ | $1/2^L$ |
| midpoint | $-2/2^L$ | $2/2^L$ |
| inwards | $-2/2^L$ | 0 |
| outwards | 0 | $2/2^L$ |

3. Remainder computation, compute R:

$$R=A-Q \times B,$$

using any standard technique. For example, when computed without the use of extra precision, we can split B into $B_{hi}$ and $B_{lo}$ such that $Q \times B_{hi}$ and $Q \times B_{lo}$ are computable without error. The remainder is simply obtained as $(A-Q \times B_{hi})-Q \times B_{lo}$. Using an architecture with a multiply-accumulate instruction the remainder may be obtained via one multiply-accumulate instruction.

An embodiment of the present invention works as follows: it accepts a number of design parameters fixed by the designer, and then produces the constraints for the unspecified parameters that would allow for an exactly representable remainder. The present disclosure will first describe the general flow of the apparatus, and then describe the three basic building blocks of the apparatus in detail.

The present invention can use either of two procedures, design by rounding and design by quotient, based on the supplied parameters. The process is diagrammed in FIG. 1.

First, a range of input values for A and B is selected 2, which affects the range of values for a and b.

$$a_{min} \leq a < a_{max} \text{ and } b_{min} \leq b < b_{max}.$$

Note the strict upper bound. If A and B are general floating-point numbers, we set $a_{min}$, $b_{min}=1$ and $a_{max}$, $b_{max}=2$. In some situations, the divisor may be a fixed constant, in which case, we can set $b_{min}=b$ and $b_{max}=b+\epsilon$.

Next, select the design method 4. This is either "design by rounding" where the rounding direction and length L are specified 6 and where the designer wishes to obtain accuracy requirements on the approximate quotient, or "design by quotient" where the accuracy characteristic of the approximate quotient is specified together with a rounding direction 8. The apparatus will then produce a list of usable rounding lengths L. If design by rounding is selected, obtain rounding direction and rounding length L 6. Otherwise, obtain rounding direction and accuracy characteristic of approximate quotient 8. That is, obtain $\alpha_{min}$ and $\alpha_{max}$ where:

$$W = \frac{A}{B}(1+\alpha)$$

$$\alpha_{min} \leq \alpha \leq \alpha_{max}.$$

If design by rounding is selected, the apparatus will produce accuracy requirement for the approximate quotient 10. That is, the apparatus will produce $\alpha_{min}$ and $\alpha_{max}$ where the approximate quotient must satisfy $$W = \frac{A}{B}(1+\alpha)$$

$$\alpha_{min} \leq \alpha \leq \alpha_{max}.$$

otherwise, the apparatus will produce a list of acceptable rounding lengths L.

The present invention uses the following error analysis, which those of ordinary skill in the art will recognize can be used to adapt the present invention to a wide variety of applications.

Define, A, B, and W as follows:

$$A = \sigma_A \times 2^m = a$$

$$B = \sigma_B \times 2^n \times b$$

$$W = \sigma_w \times 2^k \times 1.w_1 w_2 \ldots w_{p-1},$$

where $\sigma_w = \sigma_A \times \sigma_B$ and $k=(m-n)+\delta$. And, impose the restriction that:

$$-1 \leq \delta \leq 1.$$

Then, a sufficient condition for the remainder to be representable in the underlying p-significant bit floating-point format is:

$$|A - Q \times B| < 2^p lsb(Q \times B - A).$$

where "lsb" signifies the least significant bit.

Now, $$lsb(Q \times B) \geq 2^{k-L+1} \times 2^{n+1-p}$$

and $$lsb(A) \geq 2^{m+1-p}.$$

Thus, $$2^p \times lsb(Q \times B - A) \geq \min(2^{k-L+1} \times 2^{n+1}, 2^{m+1}).$$

Next, we express:

$$Q = W + \sigma_w \times 2^k \beta$$

giving:

$$A - Q \times B = -\sigma_A(\alpha|A| + 2^k \beta \times |B|).$$

Hence, the sufficient condition for a representable remainder is:

$$-\min(2^{k-L+1} \times 2^{n+1}, 2^{m+1}) < \alpha 2^m a + 2^k \beta 2^n b < \min(2^{k-L+1} \times 2^{n+1}, 2^{m+1}).$$

This condition is exploited by the present invention. For example, given a rounding method and length L, $\beta$ is bounded by specific values of $\beta_{min}$ and $\beta_{max}$. Then as long as:

$$\max\left(\frac{-\min(2^{k-L+1} \times 2^{n+1}, 2^{m+1}) - 2^k \beta 2^n b}{2^m a}\right) < \alpha$$

and, $$\alpha < \min\left(\frac{\min(2^{k-L+1} \times 2^{n+1}, 2^{m+1}) - 2^k \beta 2^n b}{2^m a}\right)$$

then, the remainder will be representable exactly.

The present invention uses three building blocks, defined below:

$$(\beta_{min}, \beta_{max}),$$

$$(\delta_{min}, \delta_{max}, OK),$$

and $$(L_0, OK).$$

($\beta$min, $\beta$max)=Beta_Bound (direction, L). This returns the value of $\beta$min and $\beta$max according to the following table:

| direction | $\beta_{\min}$ | $\beta_{\max}$ |
|---|---|---|
| nearest | $-1/2^L$ | $1/2^L$ |
| midpoint | $-2/2^L$ | $2/2^L$ |
| inwards | $-2/2^L$ | 0 |
| outwards | 0 | $2/2^L$ |

($\alpha_{min}$, $\alpha_{max}$, OK)=Alpha_Bound ($\beta_{min}$, $\beta_{max}$, L, $a_{max}$, $b_{max}$). This computes $\alpha_{min}$ and $\alpha_{max}$ based on the formula:

$$\alpha_{\min} = \min_{-1 \leq \delta \leq 1}\left(\frac{\min(2^{\delta+2-L}, 2) + \beta_{\min} b_{\max} 2^\delta}{a_{\max}}\right)$$

and $$\alpha_{\max} = \min_{-1 \leq \delta \leq 1}\left(\frac{\min(2^{\delta+2-L}, 2) - \beta_{\max} b_{\max} 2^\delta}{a_{\max}}\right)$$

Set OK to be true if $\alpha_{min} \leq 0$, $\alpha_{max} \geq 0$, and $\alpha_{min} < \alpha_{max}$, and false otherwise.

($L_0$, OK)=L_Bound ($\alpha_{min}$, $\alpha_{min}$, $\alpha_{max}$). Which returns:

$$L_0 = \min_{-1 \leq \delta \leq 1} (U_\delta, V_\delta),$$

where $$U_\delta = [-\log_2(|\alpha_{min}|\alpha_{max}/2^{2-\delta})],$$

and $$V_\delta = [-\log_2(\alpha_{max}\alpha_{max}/2^{2-\delta})].$$

Set OK to be true if $\alpha_{max} \alpha_{max} \leq 2$ and $|\alpha_{min}| \alpha_{max} \leq 2$, and false otherwise.

Figure 2:
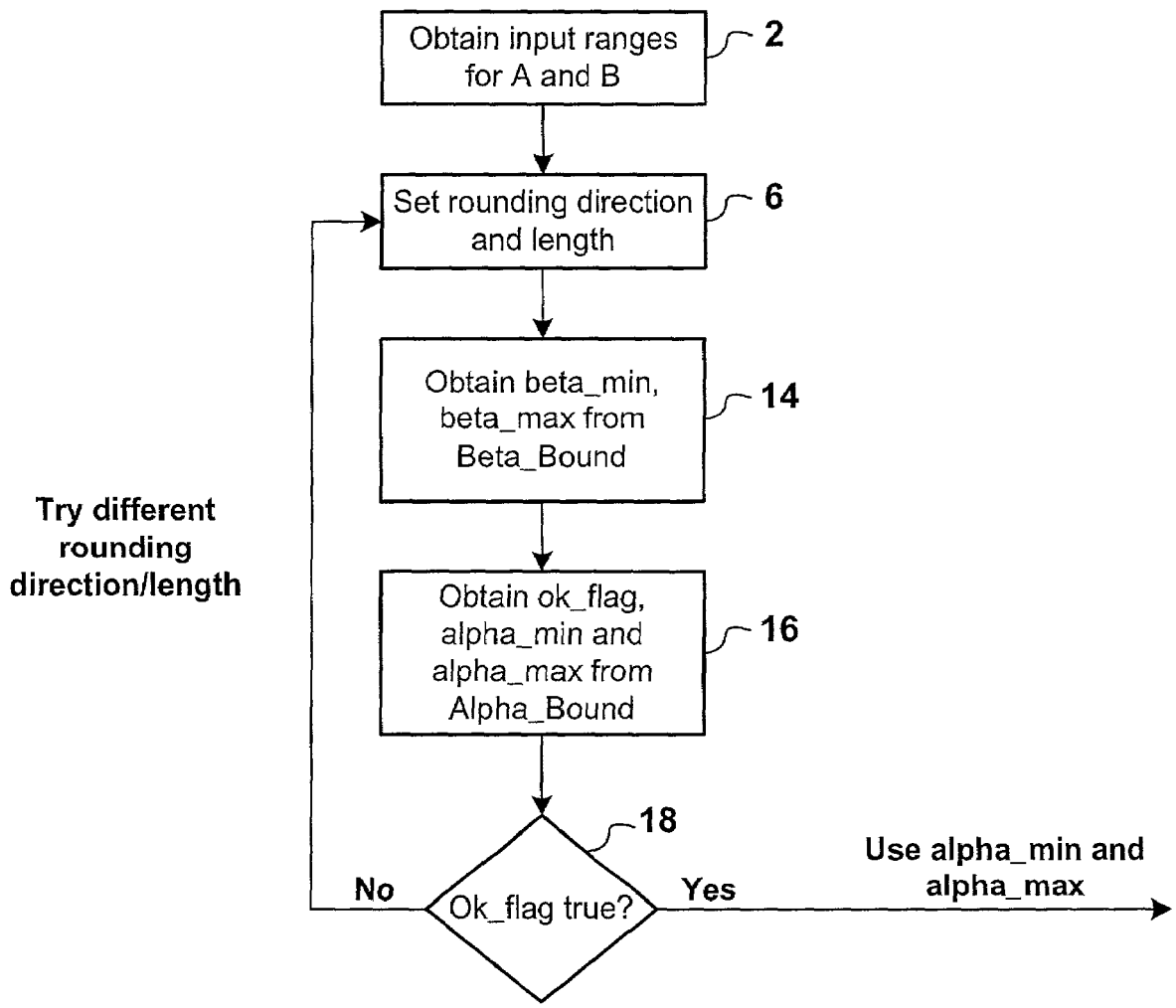
FIG. 2 is a flow chart of an embodiment of the present invention using a design by rounding technique.

FIG. 2 depicts the procedure to perform the design by rounding in detail. Given rounding direction and length 6, invoke the Beta_Bound building block to obtain $\beta_{min}$ and $\beta_{max}$ 14. Use the values of $\beta_{min}$ and $\beta_{max}$ thus obtained and $\alpha_{max}$, $b_{max}$ to invoke the Alpha_Bound building block 16. If OK produced by Alpha_Bound is false, the design is infeasible for the given input parameters. If OK is true 18, the accuracy requirement on the approximate quotient is given by $\alpha_{min}$ and $\alpha_{max}$ produced by the Alpha_Bound building block.

Figure 3:
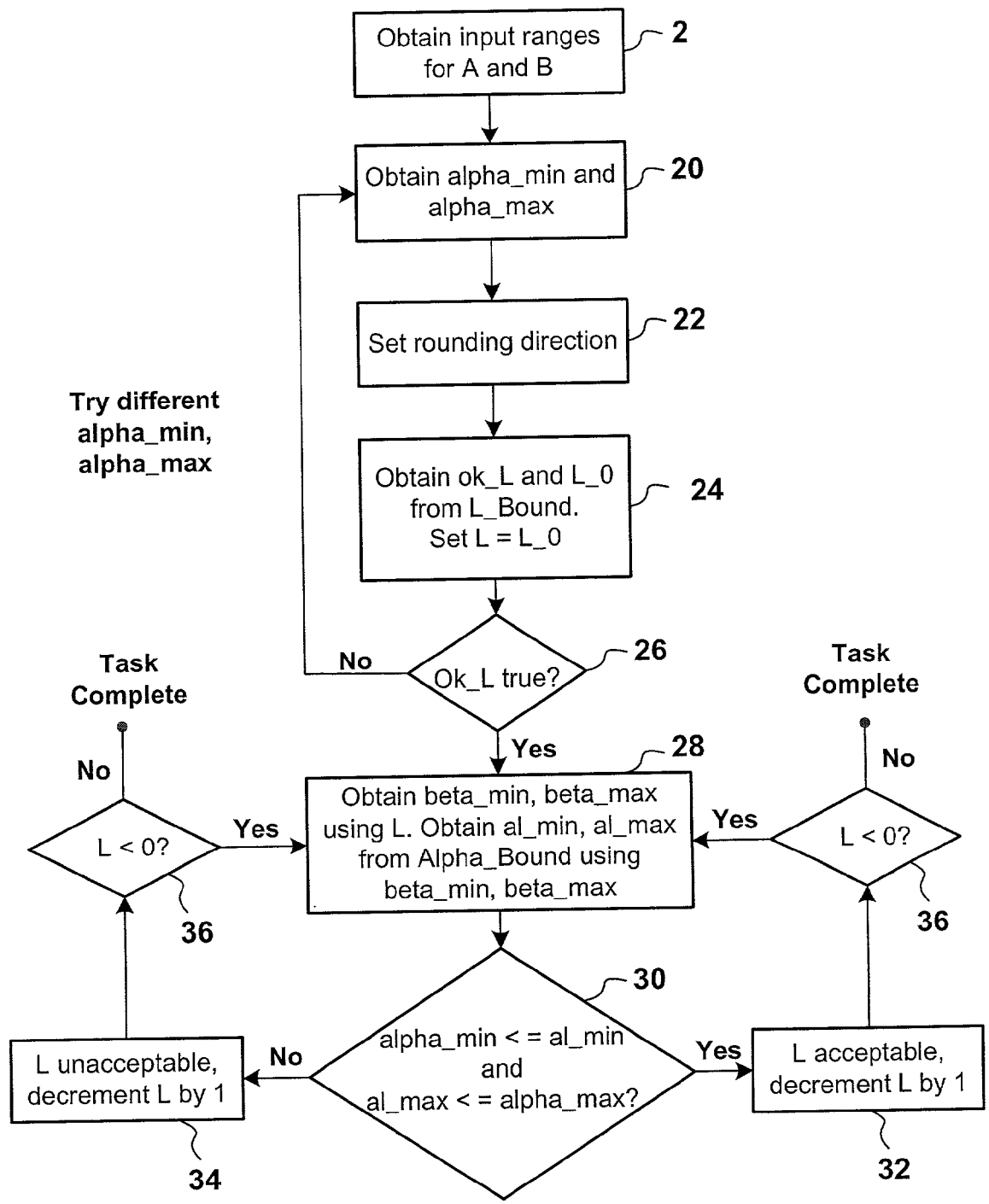
FIG. 3 is a flow chart of an embodiment of the present invention using a design by quotient technique.

FIG. 3 depicts the procedure to perform the design by quotient in detail. Given the accuracy bounds 20 on the approximate quotient $U = \alpha_{min} \leq 0, V = \alpha_{max} \geq 0$, rounding direction 22, and $\alpha_{max}$, invoke the L_Bound building block to obtain $L_0$ and OK 24. If OK 26 produced by L_Bound is false, the design is infeasible. If OK 26 is true, then for each $L = L_0, L_0-1, \ldots, 2$ then continue. Invoke Beta_Bound based on L and rounding direction 28. Invoke Alpha_Bound using the $\beta_{min}$, $\beta_{max}$, L, $a_{max}$, and $b_{max}$ 30. If OK from Alpha_Bound is true and the $\alpha_{min}$ and $\alpha_{max}$ thus obtained satisfy $\alpha_{min} \leq U$ and $V \leq \alpha_{max}$ then this L is acceptable 32. Otherwise this L value is unacceptable 34. After examining the Alpha_Bound to determine whether the current L value is acceptable 32 or unacceptable 34, the current L value might be decreased 36 where feasible.

One standard function in a run-time library of most computer systems is the two-argument inverse tangent function a tan 2 (Y,X), where in general we need to compute the value of arc tan (Y/X) for floating point inputs X and Y. Typically, the computational method takes advantage of the simple sign symmetry of the function and considers the case $0 < X,Y$. A fast algorithm based on table lookup technique can be applied to the common case where the range of Y/X is limited, say, to:

$$2^{-5} \leq (Y/X) < 2^5.$$

For this range, we find a floating-point value Q with a few significant bits such that $Q \approx Y/X$ and compute arc tan(Y/X) via the formula:

$$\arctan(Y/X) = \arctan(Q) + \arctan\left(\frac{Y - QX}{X + QY}\right).$$

All the possible values of arc tan(Q), within the range, are calculated beforehand and stored in a table. For accuracy purposes, we would like to compute Y−QX without error. One way to obtain Q is to first, compute $W \approx Y/X$ by some method. W can be expressed as:

$$W = 2^m \times 1.w_1 w_2 w_3 \ldots w_{p-1}.$$

On some machines with an efficient bit manipulation instruction, it is convenient to define Q as an L significant number of bits by:

$$Q = 2^m \times 1.w_1 w_2 w_3 w_{L-2} 1.$$

This technique is the midpoint rounding mechanism. The present invention may be used to inquire how much accuracy is needed for representing W, and efficiently create lookup tables for its calculation.

First, input the range of the fractional part of X and Y, which is set at (1,2). Specify design by rounding, with midpoint rounding as the choice, and specify L=5 so that for each m value there are 16 entries of table to store. For the parameters chosen, the present invention indicated that the design constraints not met. This signifies that the remainder Y−QX may not be representable in the underlying floating-point format.

So, we can try again with a different rounding scheme and specify rounding to nearest instead. Again, input the range of the fractional part of X and Y, which is (1,2). Specify design by rounding with nearest rounding as the choice, and specify L=5. This time the parameters result in a requirement of $a_{min} = -0.015625$ and $a_{max} = 0.015625$. Using a computer with an approximate reciprocal instruction that delivers approximately 12 significant bit of accuracy, W is calculated by:

$$W := Y \times \text{approximate-reciprocal}(X)$$

satisfies the required bounds on the $\alpha$'s. This combination of approximate W calculation, rounding method, and table size is used by the present invention to create lookup tables.

Without this method, we might have used the more convenient midpoint rounding method, leading to loss of accuracy. The rounding to the nearest method in obtaining Q from W is only very slightly more expensive (on the order of 2 extra cycles), but was revealed to be necessary by the present invention.

On architectures without approximate reciprocation capabilities, one would typically create an approximate reciprocal table. One way to create an approximate reciprocal table for a floating number $X = 1.x_1 x_2 \ldots x_m \ldots x_p - 1$ is to use the m significant bits $x_1 x_2 \ldots x_m$ to serve as an index. Thus, $X = 1 + j/2^m + \delta$, and the table contains the working-precision value of $B_j = 1/(1 + j/2^m + \frac{1}{2}^{m+1})$. Given X in the above form, we obtain j by extracting the bits $x_1$ through $X_m$. $B_j$ would approximate $1/X$ in the sense:

$$|BX - 1| \leq 2^{-(m+1)}(1 - 2^{(m+2)}).$$

For a specific value of L in the arc tangent algorithm, how large of a reciprocal table is sufficient? The present invention can generate the m values, for each specified value of L, that satisfy the bounds on the $\alpha$'s, and thus produce the reciprocal table and bounds on the remainder. That is, the present invention creates tables of reciprocal values that exactly represent the approximate remainder value within the accuracy specified.

Figure 4:
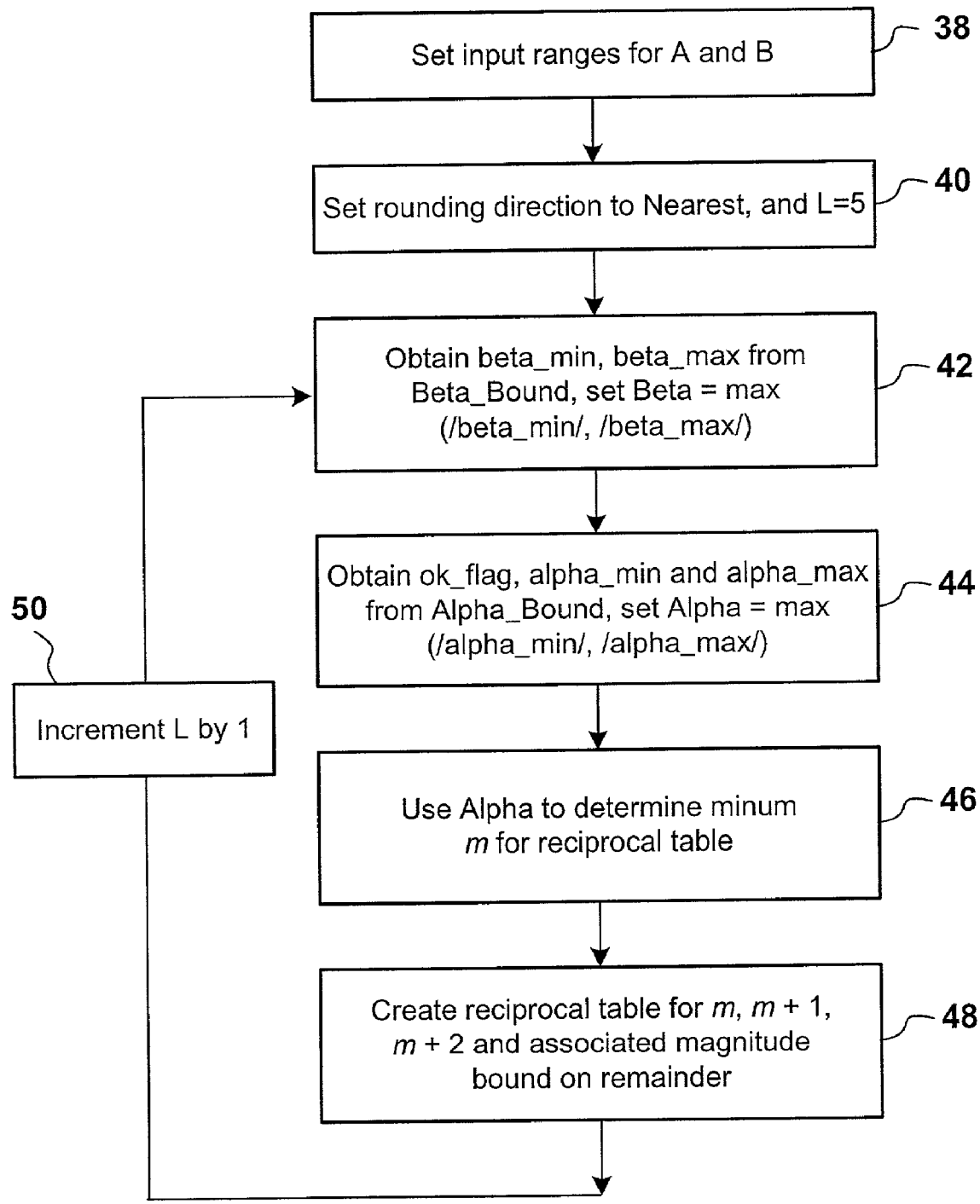
FIG. 4 is a flow chart for the creation of reciprocal tables using a design by rounding technique in accordance with an embodiment of the present invention.

FIG. 4 contains a flow chart of the table creation process. First, the input ranges of A and B are specified 38, along with a preferred rounding direction and accuracy 40. Next, the values of Beta 42 and Alpha 44 are calculated, with Alpha used to determine the minimum value of m for the reciprocal table 46. The reciprocal table is then created 48 based on the accuracy required, preferable for the minimum value of m as well as higher values. Lastly, the value of L may, optionally, be incremented 50, and the process repeated in order to create additional tables.

Tables 1 and 2 below are example reciprocal tables for the arc tangent function created by the present invention.

TABLE 1

Reciprocal Table for L = 3

| j | m = 3<br>\|Y − QX\| = 0.3125<br>Bj | m = 4<br>\|Y − QX\| = 0.28125<br>Bj | m = 5<br>\|Y − QX\| = 0.265625<br>Bj |
|---|---|---|---|
| 0 | 0.94117647 | 0.96969697 | 0.98461538 |
| 1 | 0.84210526 | 0.91428571 | 0.95522388 |
| 2 | 0.76190476 | 0.86486486 | 0.92753623 |
| 3 | 0.69565217 | 0.82051282 | 0.90140845 |
| 4 | 0.64 | 0.7804878 | 0.87671233 |
| 5 | 0.59259259 | 0.74418605 | 0.85333333 |
| 6 | 0.55172414 | 0.71111111 | 0.83116883 |
| 7 | 0.51612903 | 0.68085106 | 0.81012658 |
| 8 | | 0.65306122 | 0.79012346 |
| 9 | | 0.62745098 | 0.77108434 |
| 10 | | 0.60377358 | 0.75294118 |
| 11 | | 0.58181818 | 0.73563218 |
| 12 | | 0.56140351 | 0.71910112 |
| 13 | | 0.54237288 | 0.7032967 |
| 14 | | 0.52459016 | 0.68817204 |
| 15 | | 0.50793651 | 0.67368421 |
| 16 | | | 0.65979381 |
| 17 | | | 0.64646465 |
| 18 | | | 0.63366337 |
| 19 | | | 0.62135922 |
| 20 | | | 0.60952381 |
| 21 | | | 0.59813084 |
| 22 | | | 0.58715596 |
| 23 | | | 0.57657658 |
| 24 | | | 0.56637168 |
| 25 | | | 0.55652174 |
| 26 | | | 0.54700855 |
| 27 | | | 0.53781513 |
| 28 | | | 0.52892562 |
| 29 | | | 0.5203252 |
| 30 | | | 0.512 |
| 31 | | | 0.50393701 |

TABLE 2

Reciprocal Table for L = 4

| j | m = 4<br>\|Y − QX\| = 0.15625<br>Bj | m = 5<br>\|Y − QX\| = 0.140625<br>Bj | m = 6<br>\|Y − QX\| = 0.1328125<br>Bj |
|---|---|---|---|
| 0 | 0.96969697 | 0.98461538 | 0.99224806 |
| 1 | 0.91428571 | 0.95522388 | 0.97709924 |
| 2 | 0.86486486 | 0.92753623 | 0.96240602 |
| 3 | 0.82051282 | 0.90140845 | 0.94814815 |
| 4 | 0.7804878 | 0.87671233 | 0.93430657 |
| 5 | 0.74418605 | 0.85333333 | 0.92086331 |
| 6 | 0.71111111 | 0.83116883 | 0.90780142 |
| 7 | 0.68085106 | 0.81012658 | 0.8951049 |
| 8 | 0.65306122 | 0.79012346 | 0.88275862 |
| 9 | 0.62745098 | 0.77108434 | 0.8707483 |
| 10 | 0.60377358 | 0.75294118 | 0.8590604 |
| 11 | 0.58181818 | 0.73563218 | 0.84768212 |
| 12 | 0.56140351 | 0.71910112 | 0.83660131 |
| 13 | 0.54237288 | 0.7032967 | 0.82580645 |
| 14 | 0.52459016 | 0.68817204 | 0.81528662 |
| 15 | 0.50793651 | 0.67368421 | 0.80503145 |
| 16 | | 0.65979381 | 0.79503106 |
| 17 | | 0.64646465 | 0.78527607 |
| 18 | | 0.63366337 | 0.77575758 |
| 19 | | 0.62135922 | 0.76646707 |
| 20 | | 0.60952381 | 0.75739645 |
| 21 | | 0.59813084 | 0.74853801 |
| 22 | | 0.58715596 | 0.73988439 |
| 23 | | 0.57657658 | 0.73142857 |
| 24 | | 0.56637168 | 0.72316384 |
| 25 | | 0.55652174 | 0.7150838 |
| 26 | | 0.54700855 | 0.70718232 |
| 27 | | 0.53781513 | 0.69945355 |
| 28 | | 0.52892562 | 0.69189189 |
| 29 | | 0.5203252 | 0.68449198 |
| 30 | | 0.512 | 0.67724868 |
| 31 | | 0.50393701 | 0.67015707 |
| 32 | | | 0.66321244 |
| 33 | | | 0.65641026 |
| 34 | | | 0.64974619 |
| 35 | | | 0.64321608 |
| 36 | | | 0.63681592 |
| 37 | | | 0.63054187 |
| 38 | | | 0.62439024 |
| 39 | | | 0.61835749 |
| 40 | | | 0.61244019 |
| 41 | | | 0.60663507 |
| 42 | | | 0.60093897 |
| 43 | | | 0.59534884 |
| 44 | | | 0.58986175 |
| 45 | | | 0.58447489 |
| 46 | | | 0.57918552 |
| 47 | | | 0.57399103 |
| 48 | | | 0.56888889 |
| 49 | | | 0.56387665 |
| 50 | | | 0.55895197 |
| 51 | | | 0.55411255 |
| 52 | | | 0.54935622 |
| 53 | | | 0.54468085 |
| 54 | | | 0.54008439 |
| 55 | | | 0.53556485 |
| 56 | | | 0.53112033 |
| 57 | | | 0.52674897 |
| 58 | | | 0.52244898 |
| 59 | | | 0.51821862 |
| 60 | | | 0.51405622 |
| 61 | | | 0.50996016 |
| 62 | | | 0.50592885 |
| 63 | | | 0.50196078 |

The above arc tangent example is merely one of the many lookup tables that may be created by the present invention, which is not intended to be limited to use with arc tangents or any other particular function. Those of ordinary skill in the art will recognize, with the benefit of the present disclosure, the adjustments that must be made to adapt the present invention to create lookup tables of a given accuracy for other functions. Embodiments of the present invention may also be used to create pairs of tables, in order to provide even greater flexibility. The example below demonstrates such a two table approach to computing the arc tan(Y/X) which exploits use of $Q_{fp}$ twice.

First, a reciprocal table (first table) is used to obtain B, where $$B \sim \frac{1}{X}$$

and W is computed, using:

$$W = Y \times B$$

Rounding is used to obtain a suitable $Q_{fp}$, where:

$$Q_{fp} \tilde{\ } W$$

Next, the floating-point remainder is obtained.

$$R_{fp} = Y - Q_{fp} X$$

Finally, using a second table for the term arc tan($Q_{fp}$), arc tan(Y/X) is computed as:

$$\text{arc tan}(Y/X) = \text{arc tan}(Q_{fp}) + \text{arc tan}(Z)$$

where Z is computed based on $R_{fp}$. The size of both tables are based on the accuracy of B and Z, and the magnitude of Z.

Those of ordinary skill in the art will recognize, in light of the present disclosure, that the above "multiple table" approach can easily be extended to utilize any number of tables, and the present invention is not intended to be limited to use with one, two, or any particular number of look-up tables. In this way, embodiments of the present invention allow a very wide number of design choices which may be tailored to the constraints encountered.

The present invention is also not intended to be limited to creating tables of a given accuracy for any particular radix. That is, the tables could be created in binary, octal, decimal, hexadecimal, or any other system, so long as the distance between the most significant digit (msb) and least significant digit (lsb) is with the required precision when represented in floating-point format.

Although the above disclosure provides various embodiments and examples of the present invention for the purposes of illustration, these embodiments and examples are not intended to be an exhaustive list of all possible implementations of the present invention and should not be construed in limiting the present invention. Those of ordinary skill in the art should recognize, with the benefit of the present disclosure, that the present invention may be practiced with many modifications and variations to the specific details of the present disclosure. For example, embodiments of the present invention might be described as being implemented in hardware, while those of ordinary skill in the art will recognize the possibility of a software implementation. In such cases, the present invention is intended to cover hardware and software implementations, and combinations of the two. Similarly, not all the specific details, well-known structures, devices, and techniques that are known to those of ordinary skill in the art have been shown in order to avoid observing the present invention. The present invention is, however, intended to cover a broad range of techniques, devices, and well-known structures. The invention, therefore, is intended to be limited in scope only by the purview of the appended claims.

What is claimed is:

1. An apparatus to create a lookup table, comprising:
   a floating-point quotient generator to generate a plurality of approximate quotients to a specified precision;
   a rounding block to round said plurality of approximate quotients; and
   a table creation engine to create the lookup table and put said plurality of approximate quotients in the lookup table wherein said approximate quotients exactly represent an underlying value to said specified precision.

2. An apparatus in accordance with claim 1, wherein:
   said floating-point quotient generator processes base 10 floating-point values.

3. An apparatus in accordance with claim 1, wherein:
   said floating-point quotient generator processes base 2 floating-point values.

4. An apparatus in accordance with claim 1, wherein:
   said floating-point quotient generator processes base 8 floating-point values.

5. An apparatus in accordance with claim 1, wherein:
   said floating-point quotient generator processes base 16 floating-point values.

6. An apparatus in accordance with claim 1, wherein:
   said rounding block starts with a nearest rounding method preference.

7. An apparatus in accordance with claim 6, wherein:
   said rounding block selects a rounding method from a group consisting of nearest rounding, midpoint rounding, inwards rounding and outwards rounding.

8. An apparatus in accordance with claim 1, wherein:
   said rounding block starts with a midpoint rounding method preference.

9. An apparatus in accordance with claim 8, wherein:
   said rounding block selects a rounding method from a group consisting of nearest rounding, midpoint rounding, inwards rounding and outwards rounding.

10. In a computer system, a method of efficiently generating a set of function values, comprising:
    calculating a set of approximate quotients from a numerator and a denominator to a specified precision by a floating-point remainder technique;
    creating a lookup table with said set of approximate quotients; and
    reading one of said set of approximate quotients from said lookup table to calculate the function value to said specified precision.

11. A computer system in accordance with claim 10, wherein:
    calculating said set of approximate quotients is performed using design by rounding.

12. A computer system in accordance with claim 10, wherein:
    calculating said set of approximate quotients is performed using design by quotient.

13. A computer system in accordance with claim 10, wherein:
    calculating said set of approximate quotients comprises calculating said set of approximate quotients using a nearest rounding method.

14. A computer system in accordance with claim 10, wherein:
    calculating said set of approximate quotients comprises calculating said set of approximate quotients using a midpoint rounding method.

15. A computer system in accordance with claim 10, wherein:
    calculating said set of approximate quotients comprises calculating said set of approximate quotients using an inwards rounding method.

16. A computer system in accordance with claim 10, wherein:
    calculating said set of approximate quotients comprises calculating said set of approximate quotients using an outwards rounding method.

17. A computer system in accordance with claim 10, wherein:
    a rounding method is selected responsive to the selected precision.

* * * * *

UNITED STATES PATENT AND TRADEMARK OFFICE
CERTIFICATE OF CORRECTION

PATENT NO. : 7,013,320 B2 Page 1 of 1
APPLICATION NO. : 10/058187
DATED : March 14, 2006
INVENTOR(S) : Tang It is certified that error appears in the above-identified patent and that said Letters Patent is hereby corrected as shown below:

In column 3, at line 28, delete "modem" and insert --modern--.
In column 7, at line 43, delete "a tan 2" and insert --atan2--.
In column 11, at line 1, delete the second occurrence of "arc".
In column 11, at line 2, delete "tan(Y/X)" and insert --arctan(Y/X)--.

Signed and Sealed this

Sixth Day of November, 2007

JON W. DUDAS
*Director of the United States Patent and Trademark Office*